US005921860A

United States Patent [19]

Marsden

[11] Patent Number: 5,921,860

[45] Date of Patent: Jul. 13, 1999

[54] VEHICLE AIR OUTLET WITH UNIFORM PRECISION FEEL TO OPERATOR

[75] Inventor: Thomas G. Marsden, Eldersburg, Md.

[73] Assignee: Bowles Fluidics Corporation, Columbia, Md.

[21] Appl. No.: 08/999,772

[22] Filed: Apr. 1, 1996

[51] Int. Cl.[6] .......... B60H 1/34

[52] U.S. Cl. .......... 454/155; 454/152

[58] Field of Search .......... 454/155, 152, 454/108, 109

[56] References Cited

U.S. PATENT DOCUMENTS

| | | | |
|---|---|---|---|
| 3,602,127 | 8/1971 | Walker | 98/110 |
| 5,788,394 | 8/1998 | Hess et al. | 403/52 |
| 5,816,907 | 10/1998 | Crokett | 454/155 |

*Primary Examiner*—Harold Joyce
*Assistant Examiner*—Derek S. Boles
*Attorney, Agent, or Firm*—Jim Zegeer, Esq.

[57] ABSTRACT

A vehicle air outlet having an outlet bell, an upstream intruder member, a control shaft secured to the upstream intruder member, and a ball and socket device for mounting the control shaft to the outlet bell. In a preferred embodiment a portion of the control shaft is made to serve as a housing having a fixed hemispherically shaped bearing seat which is integrally formed therein at the closed end of the housing and a slot is formed in the housing to allow the ball supporting struts to extend outwardly from proximate the axial center of the outlet. A spring loaded bearing seat forming a second hemispherical and floating portion of the socket is guided by the housing into engagement with and to capture the is ball in the socket and a closure cap retains the compression spring in position. In a preferred embodiment, a long compression spring is used. This is advantageous over a short spring element where minor changes in compressed length can cause relatively high changes in spring force.

3 Claims, 2 Drawing Sheets

16
16B
22
18
18SC
23
18BS
18X
25
18SL
26
20
19
30
16S

10'
14'
35
21E
35
21

20
21E
35
35

VEHICLE AIR OUTLET WITH UNIFORM PRECISION FEEL TO OPERATOR

The present invention relates to a vehicle air outlet and more specifically to a vehicle air outlet having a manual joystick control member which has wide angular movements in all directions, holds its position when subjected to vehicle shocks, does not weather vane, maintains constant friction and provides a smooth, precision feel to the operator.

BACKGROUND AND BRIEF DESCRIPTION OF THE INVENTION

Stouffer et al U.S. Pat. Nos. 5,297,989 and 5,356,336 (incorporated herein by reference) disclose air outlets in which directionality of air flow exiting the outlet is controlled by an upstream intruder member in conjunction with downstream diverging side walls. The intruder member is mounted on or formed with a manually manipulated control shaft which is adjustably held in position by a ball and socket joint. Wear, dust and other aging effects can cause a deterioration in the snug friction fit between the ball and its socket so that the upstream intruder member does not hold its position when subjected to vehicle vibration and shocks and over time it can lose its smooth precision feel to the operator.

Some radio fader/balance control joysticks use compressed lubed O-rings against the ball to maintain friction. In some vehicle air outlets (e.g., U.S. Pat. No. 4,928,582) friction is obtained by loading deflector plate stacks.

The object of the present invention is to provide a vehicle air outlet having a control member which has wide angulations in all directions, holds its position when subjected to vehicle shocks, does not weather vane, and maintains constant friction and provides a smooth, precision feel to the operator.

According to the invention the ball and socket disclosed in the aforementioned Stouffer et al patents is provided with a bearing seat which is loaded or biased against the ball with a coil spring. In a preferred embodiment a portion of the control shaft is made to serve as housing having a fixed hemispherically shaped bearing seat is integrally formed therein at the closed end of the housing, and a slot is formed in the housing to allow the ball supporting struts to extend outwardly from proximate the axial center of the outlet. A spring loaded bearing seat forming a second hemispherical and floating portion of the socket is guided by the housing into engagement with and to capture the ball in the socket and a closure cap retains the compression spring in position. In a preferred embodiment, a long compression spring is used. This is advantageous over a short spring element where minor changes in compressed length can cause relatively high changes in spring force.

DESCRIPTION OF THE DRAWINGS

The above and other objects advantages and features of the invention will become more apparent when considered with the following specification and accompanying drawings, wherein.

DETAILED DESCRIPTION OF THE INVENTION

Figure 1:
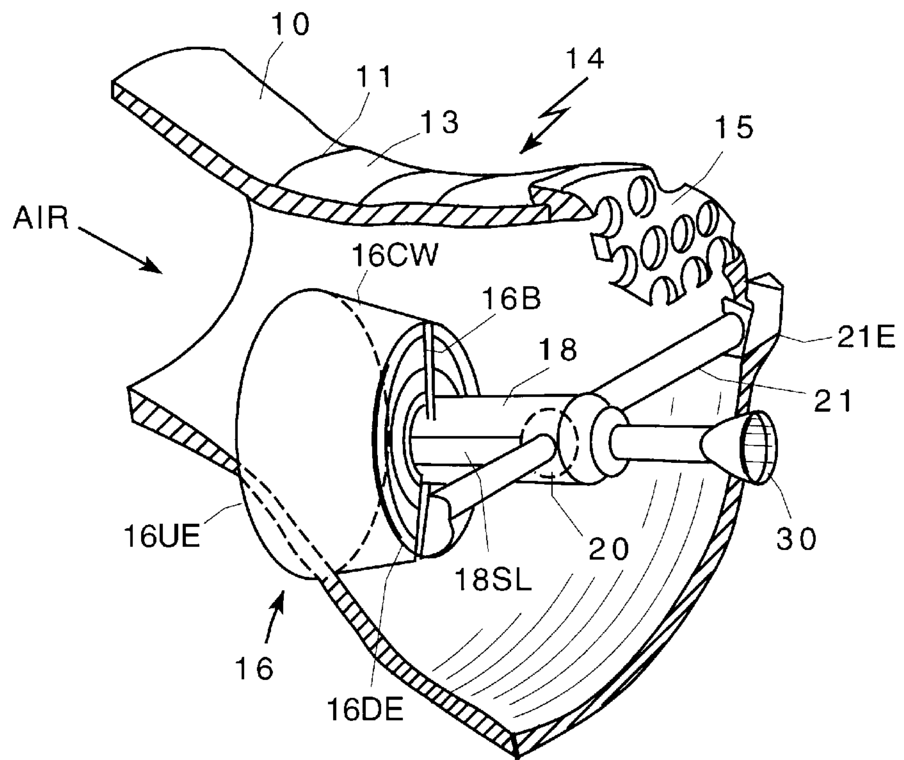
FIG. 1 is a partially cut-away isometric perspective view of a vehicle air outlet incorporating the invention.
Figure 2:
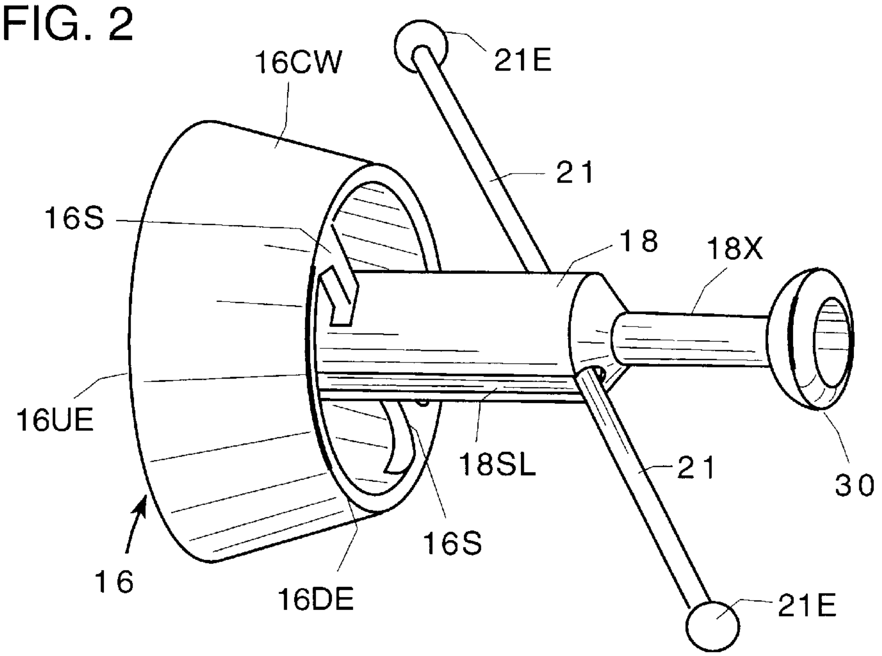
FIG. 2 is a perspective view of the intruder and control member.
Figure 3:
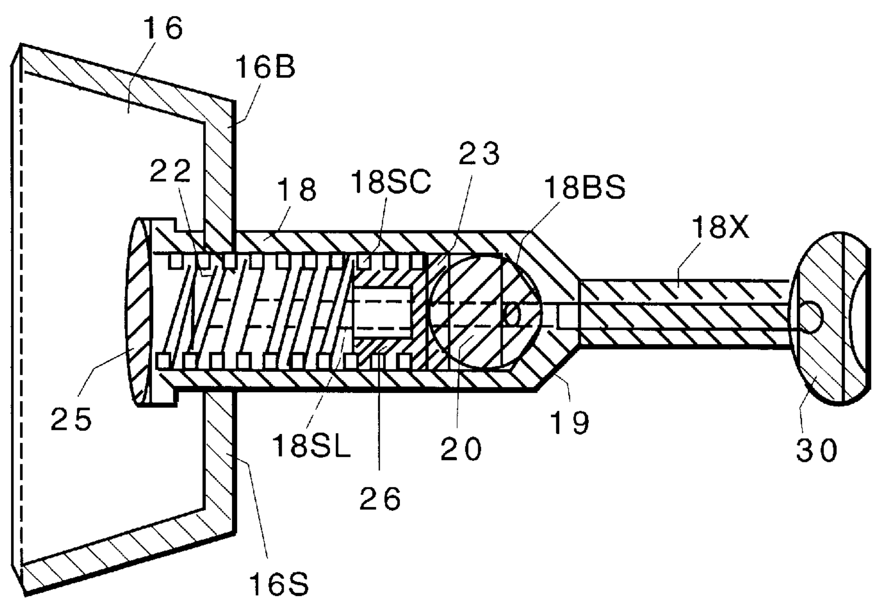
FIG. 3 is sectional view of the intruder and control shaft and the stationary ball.

The invention has particular usefulness where a manual control shaft or "joystick" is to be mounted in a vehicle air outlet to manipulate an upstream intruder member. As shown in FIG. 1, a circular input duct 10 converges to a throat area 11 where it is connected to the upstream end 13 of downstream diverging outlet bell 14 which, in this embodiment, is closed off by an outlet grille 15, preferably of the type disclosed in the above referenced Stouffer et al patents. However other types of grilles can be used. In fact there can be applications where no outlet grille is required.

Upstream intruder or deflection controller 16, which, in this embodiment, is a frustrum of a cone having an upstream end 16*ue* and a downstream end 16*de* joined by a converging wall 16*cw*. Other forms of intruders are shown in the above reference Stouffer et al patents and it is not necessary that the walls converge or converge in a downstream direction. A control shaft 18 is secured to intruder 16 by support braces 16*s*. Control shaft 18 includes a socket chamber 18*sc* which has a fixed hemispherically shaped bearing seat 18*bs* is integrally formed therein at the closed end 19 of the socket chamber 18*sc*. (These seats could be conical, spherical, etc.) Ball 20 is secured to support bar 21 which, in turn, has its lateral ends 21*le* fixedly secured to the perimeter of outlet bell 14. Slots 18*sl* are formed in both sides of the housing socket chamber 18*sc* to allow the ball supporting arms or struts to extend outwardly from proximate the axial center of the outlet. It will be appreciated that the ball 20 and control shaft 18, while preferably located proximate the axial center of the outlet, need not be located proximate the center. Esthetic design considerations may dictate off center locations. Spring 22 biases or loads bearing seat 23 thereby forming a second hemispherical socket portion which floats This floating portion 23 of the socket is guided by the housing into engagement with and captures ball 20 in the socket.

A closure cap 25, secured in place by an adhesive, snap fit, sonic bonding or threads, retains the compression spring 22 in position. In a preferred embodiment, a long compression spring is used. This is advantageous over a short spring element where minor changes in compressed length can cause relatively high changes in spring force. Note that one end of the spring telescopes over shank 26 on bearing seat member 23. The shaft portion 18*x* extends through an opening (not shown) in grille 15. Knob 30 is provided for grasping by the user to adjust the position of the intruder 16 relative to the walls of the outlet to thereby determine the direction of deflection of air exiting the outlet bell 13.

Figure 4:
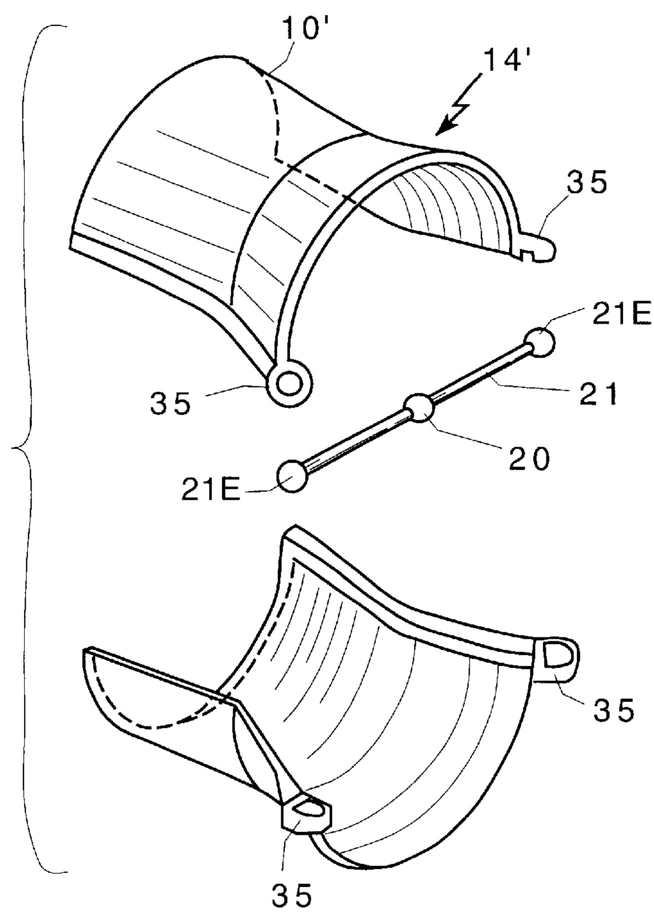
FIG. 4 is an exploded perspective view illustrating the assembly of the outlet bell with the ball and its supporting strut(s).

FIG. 4 illustrates a construction in which the duct 10' and outlet bell or flare 14' shaped in two halves with support arm securement fitment sockets 35 adapted to receive and fixedly secure the lateral ends 21*e* of support bar 21 so that the rod does not rotate in its fitment sockets 35 when the upper and lower halves are joined. The intruder and cap could also be integrally formed, which allows assembly of ball and support rod through open end of housing. If the components intruder 16 and housing are integrally formed, an aperture the size of ball can be formed at the base of slot 18*sl* so that ball can be fitted into the housing on the downstream side of supports 16*s*.

Thus, the vehicle air outlet of this invention has a manual joystick control member which has wide angular movements in all directions, holds its position when subjected to vehicle shocks, does not weather vane, maintains constant friction and provides a smooth, precision feel to the operator.

While a preferred embodiment of the invention has been shown and illustrated it will be appreciated that various changes, adaptations and modifications of the invention will be readily apparent to those skilled in the art.

What is claimed is:

1. In a vehicle air outlet having an outlet bell, an upstream intruder member, a control shaft secured to said upstream intruder member, and a ball and socket device for mounting said control shaft to said outlet bell, the improvement comprising said ball and socket device having a fixed hemispherical socket portion, a floating hemispherical socket portion, spring means for loading said floating hemispherical socket portion in a direction to capture said ball between said hemispherical socket portions and wherein said spring means is a long coil spring having a length such that minor changes in compressed length does not cause high changes in spring force on said ball.

2. The air outlet defined in claim 1 wherein a portion of the control shaft is hollow and serves as housing for said long coil spring and floating hemispherical socket portion.

3. The air outlet defined in claim 2 wherein said socket includes a fixed hemispherically shaped bearing seat integrally formed in said housing, at least one ball support strut secured to said ball, and a slot means formed in said housing to allow the ball supporting strut to extend outwardly to said outlet bell.

* * * * *